United States Patent
Chan et al.

(10) Patent No.: US 7,197,765 B2
(45) Date of Patent: Mar. 27, 2007

(54) METHOD FOR SECURELY USING A SINGLE PASSWORD FOR MULTIPLE PURPOSES

(75) Inventors: Keen W. Chan, Beaverton, OR (US); Enest F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 869 days.

(21) Appl. No.: 09/753,257

(22) Filed: Dec. 29, 2000

(65) Prior Publication Data

US 2002/0087890 A1    Jul. 4, 2002

(51) Int. Cl.
*H04K 1/00*   (2006.01)
*H04L 9/00*   (2006.01)
*G06F 7/00*   (2006.01)

(52) U.S. Cl. .................... 726/8; 713/183; 715/741
(58) Field of Classification Search ............. 713/169, 713/202, 182–184; 726/8, 5; 715/741
See application file for complete search history.

(56) References Cited

U.S. PATENT DOCUMENTS

| 5,315,658 | A | * | 5/1994 | Micali | 380/286 |
| 5,684,950 | A | | 11/1997 | Dare et al. | |
| 5,719,941 | A | * | 2/1998 | Swift et al. | 713/155 |
| 5,787,169 | A | * | 7/1998 | Eldridge et al. | 713/165 |
| 5,892,828 | A | | 4/1999 | Perlman | |
| 5,944,824 | A | | 8/1999 | He | |
| 6,000,033 | A | * | 12/1999 | Kelley et al. | 713/202 |
| 6,006,333 | A | * | 12/1999 | Nielsen | 713/202 |
| 6,064,736 | A | * | 5/2000 | Davis et al. | 713/202 |
| 6,141,760 | A | * | 10/2000 | Abadi et al. | 713/202 |
| 6,243,816 | B1 | * | 6/2001 | Fang et al. | 713/202 |
| 6,496,855 | B1 | * | 12/2002 | Hunt et al. | 713/202 |
| 6,601,175 | B1 | * | 7/2003 | Arnold et al. | 713/202 |
| 6,826,686 | B1 | * | 11/2004 | Peyravian et al. | 713/168 |
| 2002/0067832 | A1 | * | 6/2002 | Jablon | 380/277 |
| 2002/0071560 | A1 | * | 6/2002 | Kurn et al. | 380/277 |

OTHER PUBLICATIONS

Menezes, "Handbook of Applied Cryptography," 1997, p. 390.*
Schneier, "Applied Cryptography," 1996, pp. 165-166 and 429-431.*

* cited by examiner

*Primary Examiner*—Gilberto Barron, Jr.
*Assistant Examiner*—Matthew Heneghan
(74) *Attorney, Agent, or Firm*—Blakely, Sokoloff, Taylor & Zafman LLP

(57) ABSTRACT

A method receives input data and determines if a salt value exists. The method generates a salt value and stores the salt value in a table entry if the salt value does not exist. The method further retrieves the salt value from the table entry if the salt value exists and generates a hash from the salt value and the input data. The method further includes generating a password from the hash and returning the password to an application to gain entry to the application. Also a program storage device readable by a machine includes instructions that cause the machine to perform similarly to the method.

27 Claims, 4 Drawing Sheets

METHOD FOR SECURELY USING A SINGLE PASSWORD FOR MULTIPLE PURPOSES

BACKGROUND OF THE INVENTION

1. Field of the Invention

This invention relates to application password protection, and more particularly to a method of generating a plurality of passwords from a single strong password or passphrase that is not stored.

2. Background Information

Many of todays software applications require users to enter a password. These applications may reside on a personal computer and/or a server that may be connected to a personal computer via a network. If a user uses a plurality of software applications that require the use of a password to gain entry, the user must either memorize many passwords, have these many passwords stored, or write them down. The passwords may be stored on the personal computer and/or the server where the software application resides. Some of these stored passwords may not be encrypted. Many users use the same or similar passwords, or a set of passwords to ease the memory requirement. A problem with this scheme is that not all software applications use cryptographic means of protecting the passphrase, or secret that is entered by the user. Thus, the users passwords may be compromised.

Also, a compromise of a password (also known as a passphrase) to one application may allow all other applications that use the same password to be compromised. Further, the password is sometimes used in software applications, such as wrapping a cryptographic key, in which the user can be attacked with a brute force password search. For example, an adversary that obtains a wrapped cryptographic key can test if the correct password is found. Thus, if the password size is not too large, the adversary can search over all of the password space until the correct password is found. To protect against this theft, a large or complex password is necessary. The problem with having large complex passwords is that a user must now remember a plurality of long or complex passwords.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The invention generally relates to a method to allow application software users to use a single strong password or passphrase that is used to generate a plurality of individual passwords or passphrases for a plurality of software applications. Referring to the figures, exemplary embodiments of the invention will now be described. The exemplary embodiments are provided to illustrate the invention and should not be construed as limiting the scope of the invention.

Figure 1:
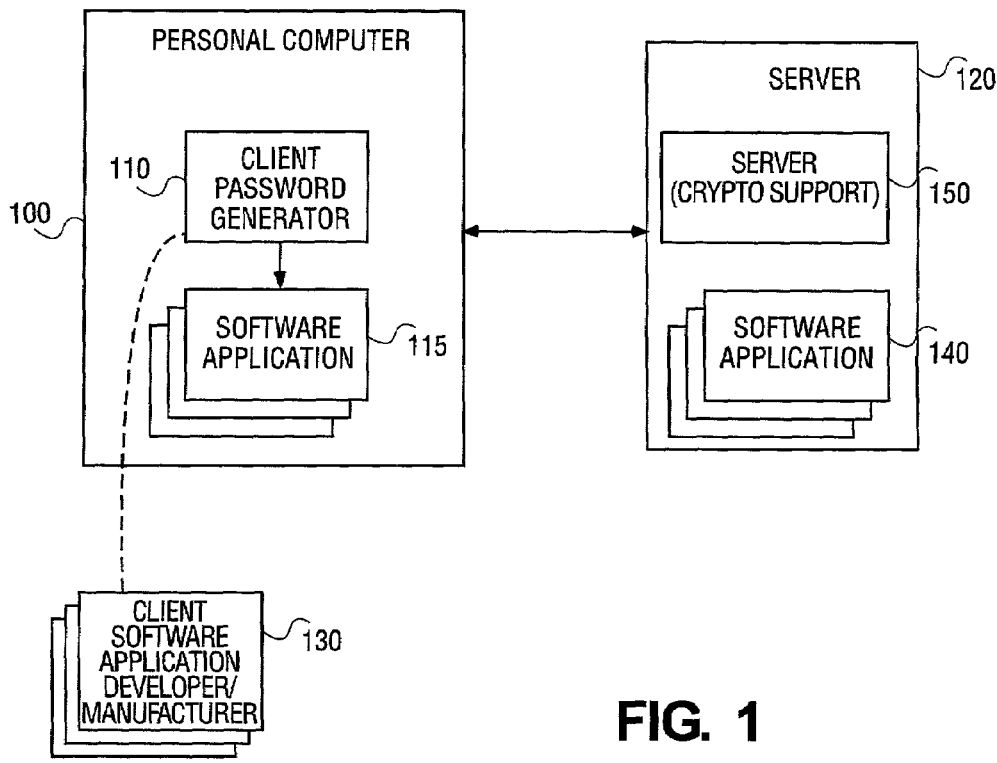
FIG. 1 illustrates an embodiment of the invention having a client password generator.

FIG. 1 illustrates an embodiment of the invention comprising personal computer 100, client password generator 110, server 120, server cryptographic support services 150, client software manufacturer/developer 130, and software application(s) 115 and 140. Software application 115 and 140 can be any software application requiring a password to enable entry. Software application 115 can run on server 120, where software application 140 can run on personal computer 100. It should be noted that software application 140 can also be run on other devices, such as personal digital assistants (PDAs), cellular telephones, and other similar portable devices. There may be many software applications 140 to be run on personal computer 100, and likewise for software application 115 on server 120. Client software application manufacturer 130 develops versions of client password generator 110.

Figure 2:
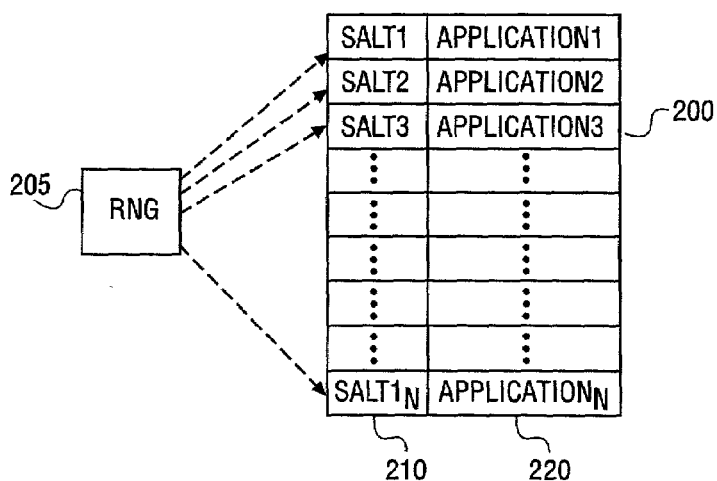
FIG. 2 illustrates an embodiment of the invention having a table entry.

In one embodiment, client password generator 110 contains random number generator (RNG) 205 to generate a salt value. RNG 205 may be any conventional RNG. A salt value may be generated for each software application. FIG. 2 illustrates table entry 200 having salt value entries 210 and application entries 220. Each application that uses a generated password (generated by client password generator 110) has an associated salt value entry 210. In another embodiment, salt value entries 210 are random values selected by each client software application developer 130.

Figure 3:
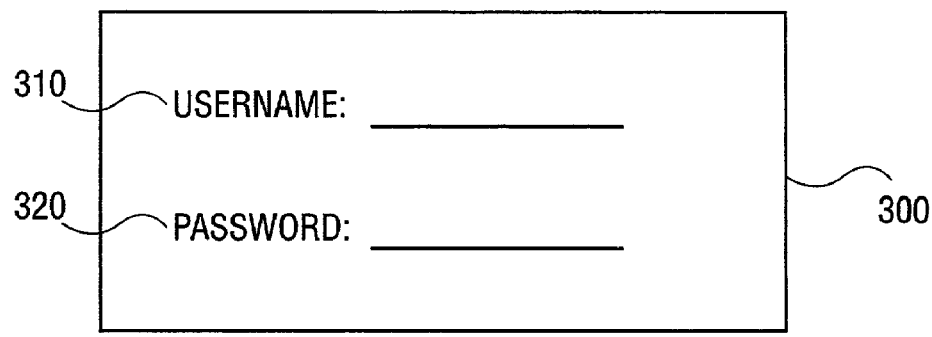
FIG. 3 illustrates an embodiment of the invention having a graphical user interface (GUI) for entering user inform ation.
Figure 4:
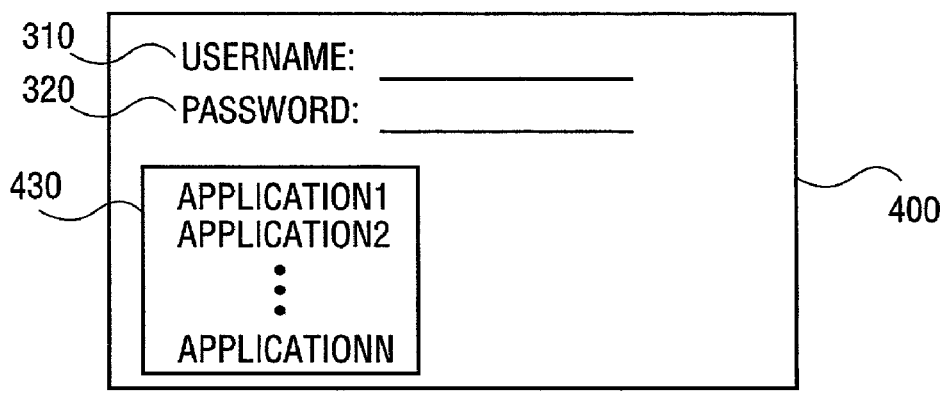
FIG. 4 illustrates an embodiment of the invention having a GUI for entering user inform ation and selecting an application.
Figure 5:
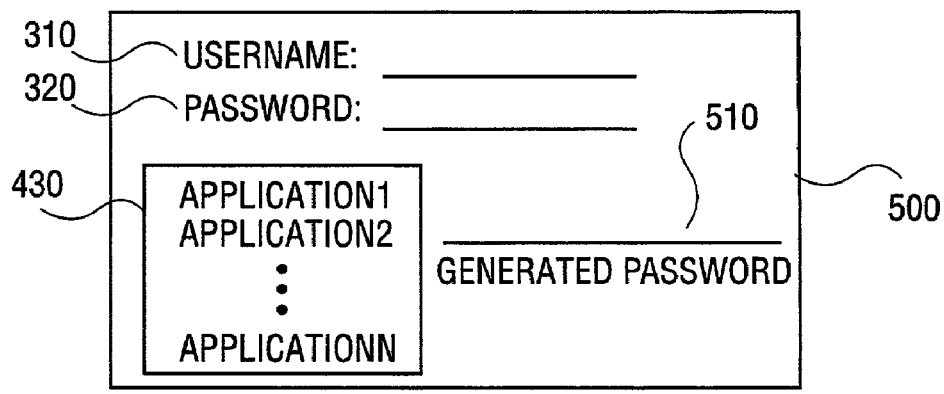
FIG. 5 illustrates an embodiment of the invention having a GUI for entering user information, selecting an application and displaying a generated password.

In one embodiment, client password generator prompts a user for a user identification and a strong password or passphrase. A strong password or passphrase is a password or passphrase that has enough entropy to prevent an adversary from easily determining the strong password or passphrase through a brute force password search over possible passwords. The user identification and strong password or passphrase can be entered from devices such as a keyboard, a voice activated system, or a computer pointing device. FIG. 3 illustrates one embodiment of graphical user interface (GUI) 300 that prompts a user to enter user identification (or username) 310 and strong password or passphrase 320. FIG. 4 illustrates an embodiment of graphical user interface (GUI) 400 that prompts a user for user identification 310, strong password or passphrase 320, and application menu 430 to select an application the user desires to generate a password for. If an application does not exist in application menu 430, a user can enter the name of the new application in an application entry GUI (not shown). FIG. 5 illustrates an embodiment of graphical user interface (GUI) 500 that prompts a user for user identification 310, strong password or passphrase 320, application menu 430 to select an application the user desires to generate a password for, and returns a password for the selected application to generated password display 510. A user can then manually enter the generated password when prompted by an application requiring the password. In another embodiment, a plurality of strong passwords or passphrases can be used to to generate application passwords that represent various security levels, such as confidential, secret and top secret.

In one embodiment, once client password generator 110 gets the user's strong password or passphrase entry and user identification, a salt value is retrieved for the specific application if it exists in table entry 200. If a salt value does not exist for the specific application that a user desires a password to be generated, RNG 205 generates a salt value that is entered in table entry 200 that is associated with the specific application.

Client password generator 110 uses the strong password or passphrase, user identification and salt value to generate an application specific password that is a hash of the strong password or passphrase, user identification and salt value. Standard hash programs can be used, such as Secure Hash Algorithm, SHA-1 and message digest algorithm, MD5. One should note that other hash algorithms can also be used. Once the hash is complete, an application specific password is returned. In one embodiment, the returned generated password is directly interfaced into the application requiring the password. The generated password may be temporarily stored on the platform each time the strong password or passphrase is entered and the application specific password is generated. The length of time that the generated password is temporarily stored is controlled by client password generator 110 in one embodiment. In another embodiment, a user inputs a predetermined time period for which the generated password may be stored dependent on the platform, such as personal computer 100 or server 120.

In one embodiment, a hash function is selected to be slow. This is to slow down an adversary that is trying a brute force attack to determine what password hashes to a given value. The adversary must compute the slow hash function for every password that he searches, while the real user needs to only compute the hash function for the single password that he enters. Thus, by slowing down the hash function, a user can use a password with less entropy and achieve equivalent security. One embodiment of a slow hash function is to iterate a hash function multiple times.

In one embodiment, since the amount of entropy depends on a hash function, if a hash function requires 0.1 seconds to complete on a 1 Gigahertz processor computer, at least 40 bits of entropy is sufficient to ensure protection from a brute force attack by an adversary to try to determine a password in less than 1 million days of computing on 1 Gigahertz processor computers. One should note that other sizes of entropy may be used.

In another embodiment, client password generator 110 monitors activity on the platform where client password generator 110 is running for certain activity, such as amount of application use or logon data. In one embodiment, client password generator 110 determines if a generated password is stored on a platform. If the generated password is not stored on the platform, client password generator 110 prompts a user to enter a strong password or passphrase and input information to generate the application specific password. It should be noted in one embodiment, a user can choose not to store the generated password on the platform running the client password generator. In this embodiment, client password generator 110 prompts the user for a strong password or passphrase and input information each time a password needs to be generated for an application to be entered.

Figure 6:
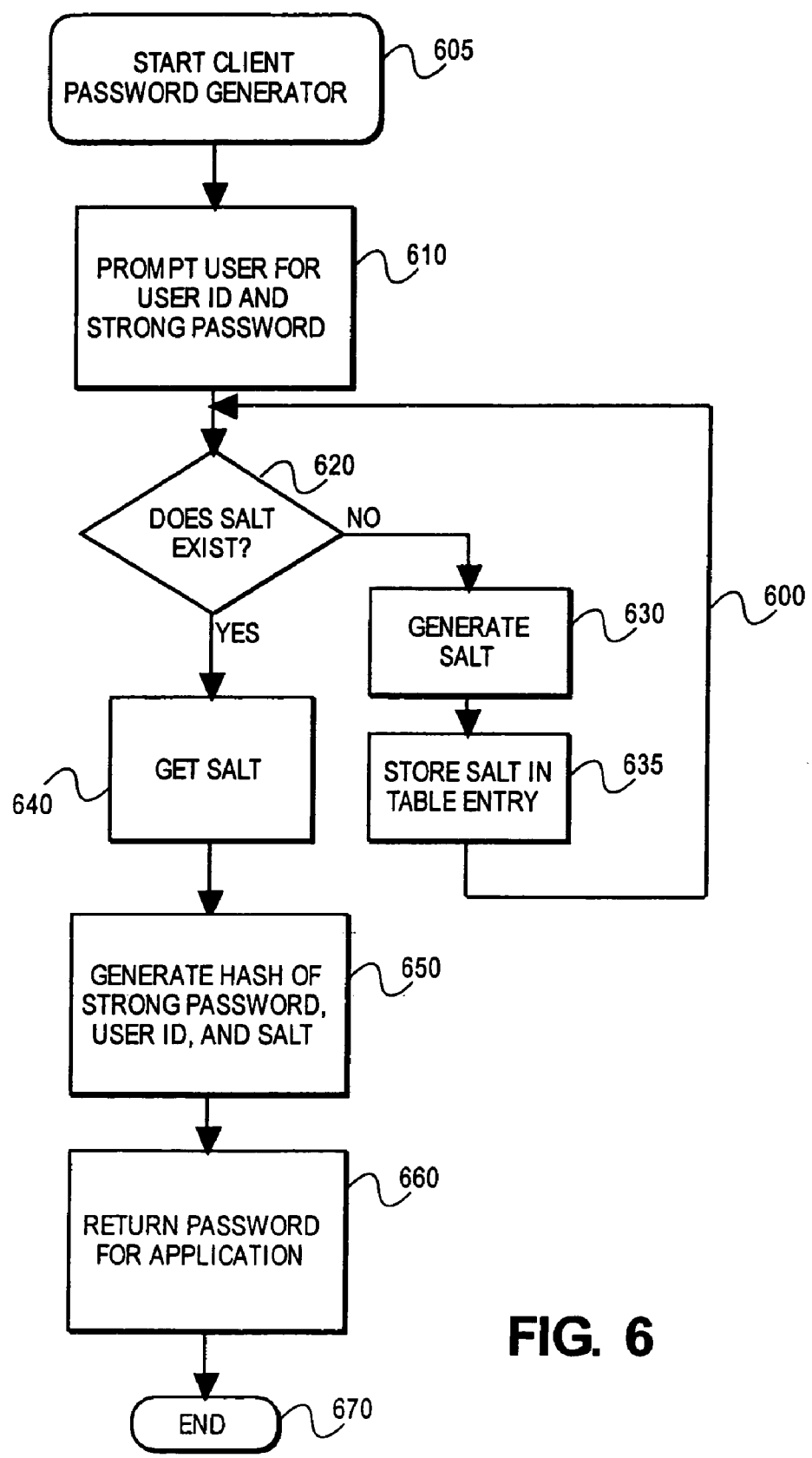
FIG. 6 illustrates a flow diagram of a process of an embodiment of the invention.

FIG. 6 illustrates a flow diagram of an embodiment of the invention for client password generator 110 to generate an application password. Process 600 starts at operation 605 as a user executes client password generator 110. Next, operation 610 is executed prompting a user for a strong password or passphrase and a user identification. Process 600 continues with operation 620 determining if a salt exists for the specific application. In one embodiment, operation 620 queries table entry 200 and searches for an application name and associated salt. If a salt does not exist for a selected application, operation 630 generates a salt for the selected application. After a salt is generated, in one embodiment operation 635 stores salt in table entry 200. Process 600 continues with operation 640 where a salt is retrieved from table entry 200. At this time, process 600 continues to operation 650. Operation 650 generates an application specific password that is a hash of the user identification, strong password or passphrase and salt that is associated for the specified application. Process 600 then continues with operation 660 returning a generated password for the specified application. After block 660 is complete, process 600 ends at block 670.

Occasionally, an application requiring a password may prompt a user to change the required password, or a user may choose an option on the application to change his password. In one embodiment, the application would require the old password and a new password. To generate the old password, client password generator 110 initiates process 600 with a request for the old password. To generate the new password, client password generator 110 initiates process 600 with a request for the new password.

Figure 7:
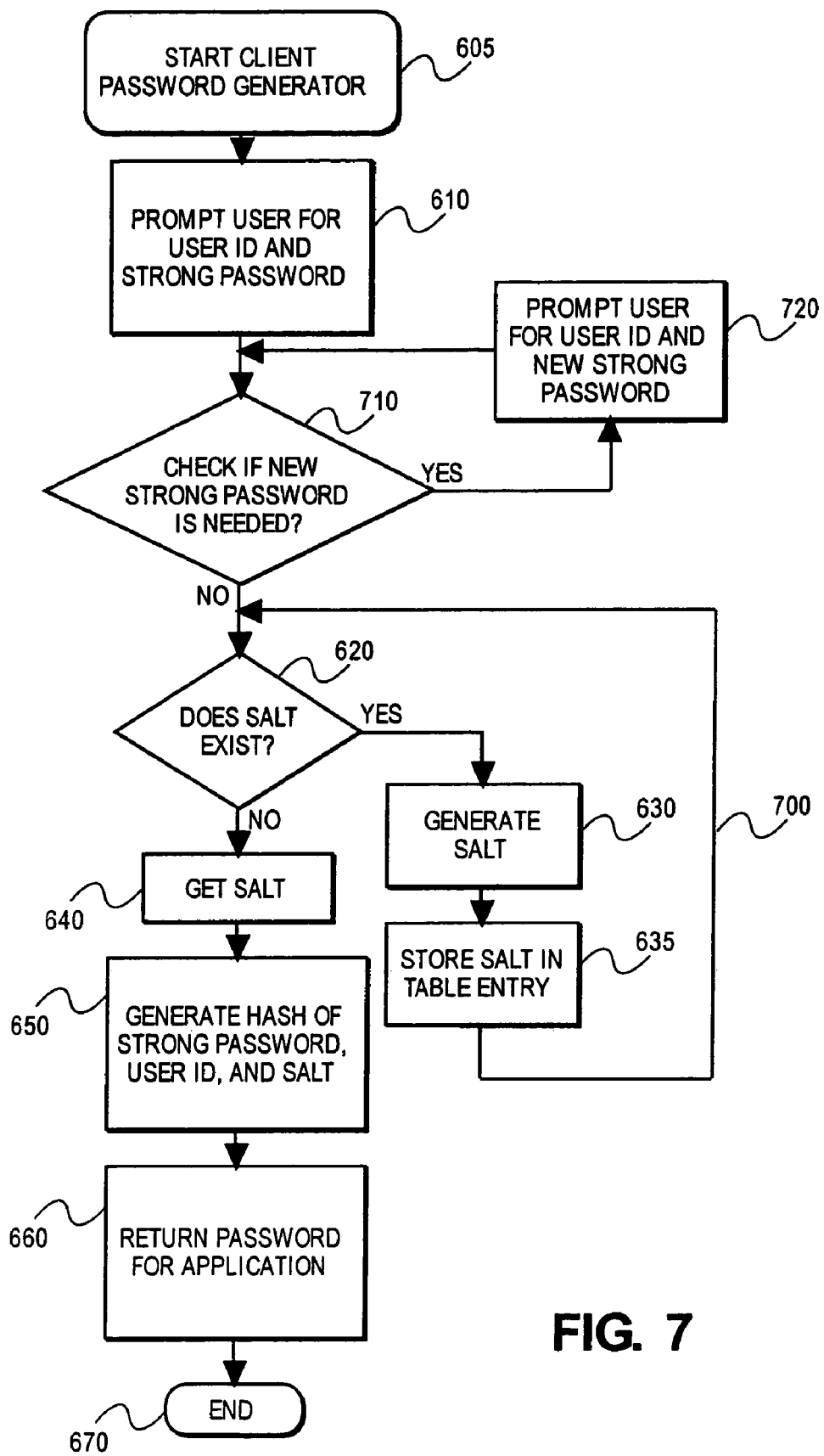
FIG. 7 illustrates a flow diagram of a process of an embodiment of the invention which also determines if a new strong password or passphrase is needed.

FIG. 7 illustrates process 700 of an embodiment of the invention that adds operations 710 and 720 to process 600 illustrated in FIG. 6. Operation 710 determines if a new strong password or passphrase is required to be entered by a user. If a new strong password or passphrase is required, operation 720 prompts the user for a new strong password or passphrase and user identification. After the user enters this information, process 700 continues with operation 710.

In one embodiment, when the user changes his strong password, he will need to change passwords on all applications so the applications will all be using a password derived from the new strong password.

In one embodiment, an application profile is associated with each application and indicates if a new strong password or passphrase is being used for each application in table entry 200. In another embodiment, a field may be added to indicate a date a new strong password was entered. Since changing the passwords for all applications may be very time consuming, the user can choose to change some passwords at a later time. In one embodiment, client password generator 110 prompts the user for each application that has not yet used the new strong password or passphrase to generate an application specific password. The user is prompted to enter the old strong password or passphrase and then the new strong password and passphrase at this time.

In another embodiment, after the user has entered the new strong password, a computation is performed and the result stored that allows the client password generator to compute the old strong password from the new strong password. An example of this would be to encrypt the old strong password with the new strong password. In this case, the user would not need to enter the old strong password in order to change the password for each application. When an application requires both the old password and the new password for an application, the user would enter just his new strong password, and the client password generator would compute the old strong password, and then generate both the old and new passwords for that application.

In one embodiment, the user is prompted to occasionally change the strong password or passphrase. A user can choose a predetermined period of time to be reminded to change the strong password or passphrase. The embodiments of the invention allow users to only need remember one strong password or passphrase while generating a plurality of application specific passwords. If an attacker was to compromise one password of a specific application, all other passwords for other applications are not compromised. Also, the strong password or passphrase is not stored. Also, operating systems and applications need not be modified for the above embodiments.

The above embodiments can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method performed by a machine comprising:
   receiving a user password;
   receiving a user identification;
   receiving a plurality of names for independent software applications that require a password for a user to use any of the software applications;
   generating a unique and specific randomly generated salt value for each independent software application;
   computing a software application dependent password for a user for a selected independent software application, wherein the software application dependent password only depends on the user password, the user identification and the specific randomly generated salt value associated with the selected software application; and
   returning the software application dependent password for the selected independent software application to the user,
   wherein a user does not need to one of remember the selected software application dependent password and record the selected software application dependent password as the software application dependent password is one of computed each time a user requests access to the software application and temporarily stored a first time the user requests access to the software application for a predetermined time period.

2. The method of claim 1, wherein the computation of the software application dependent password further includes hashing the user name, the user password, and the salt value for the software application.

3. The method of claim 1, further comprising generating an old password if the old password is required.

4. The method of claim 1, wherein a strong password is used to generate a plurality of software application passwords.

5. A method performed by a machine comprising:
   receiving a plurality of names for independent software applications that require a password for a user to use any of the software applications;
   generating a plurality of random salt values for each software application;
   generating a hash from one random salt value and input data, the one salt value only associated with one specific software application, the input data including a user identification and a strong password;
   generating a software application dependent password from the hash; and
   returning the software application dependent password to a user to gain entry to the software application,
   wherein a user does not need to one of remember the software application dependent password and record the software application dependent password as the software application dependent password is one of computed each time a user requests access to the specific software application and temporarily stored a first time the user requests access to the specific software application for a predetermined time period.

6. The method of claim 5, further comprising:
   receiving the input data;
   determining if the salt value exists;
   generating the salt value and storing the salt value in a table entry if the salt value does not exist; and
   retrieving the salt value from the table entry if the salt value exists.

7. The method of claim 5, wherein the input data further comprises a software application identification.

8. The method of claim 5, further comprising determining if a new strong password is required; and
   retrieving the new strong password if the new strong password is required.

9. The method of claim 5, wherein the strong password is used to generate a plurality of software application passwords.

10. The method of claim 5, wherein the salt value is one of predetermined and generated by a random number generator.

11. The method of claim 5, wherein the salt value and the software application are associated in the table entry.

12. The method of claim 5, wherein the software application is run on one of a local computer system and a networked computer system.

13. The method of claim 5, wherein one of a secure hash algorithm (SHA-1) and a message digest (MD5) algorithm are used to generate the hash.

14. The method of claim 5, wherein the generated password is temporarily stored in a memory for a predetermined time period.

15. The method of claim 14, wherein the predetermined time period is based on platform activity.

16. The method of claim 15, wherein the platform is one of a local computer system and a networked computer system.

17. A program storage device readable by a machine comprising instructions that cause the machine to:
   receive a plurality of names for independent software applications that require a password for a user to use any of the software applications;
   generate a plurality of random salt values for the software applications;
   generate a hash for each of the plurality of random salt values and input data, each salt value only associated with one specific software application, the input data including a user identification and a strong password;
   generate a software application dependent password for one hash for a user selected software application; and
   return the software application dependent password to a user for the selected software application to gain entry to the selected software application, wherein the user does not need to one of remember the software application dependent password for the selected software application and record the software application dependent password for the selected software application as the software application dependent password is generated each time a user requests access to the selected software application.

18. The program storage device of claim 17, further comprises instructions that cause the machine to:
   receive input data;
   determine if a salt value exists;
   generate a salt value and store the salt value in a table entry if the salt value does not exist; and
   retrieve the salt value from the table entry if the salt value exists.

19. The program storage device of claim 17, wherein the input data further comprises a software application identification.

20. The program storage device of claim 17, further comprises instructions that cause the machine to:
   determine if a new strong password is required; and
   retrieve the new strong password if the new strong password is required.

21. The program storage device of claim 20, wherein the strong password is used by the machine to generate a plurality of software application passwords.

22. The program storage device of claim 17, wherein the salt value is one of predetermined and generated by a random number generator.

23. The program storage device of claim 17, wherein the salt value and the software application are associated in the table entry.

24. The program storage device of claim 17, wherein one of a secure hash algorithm (SHA-1) and a message digest (MD5) algorithm are used in instructions to cause the machine to generate the hash.

25. The program storage device of claim 17, wherein the generated password is temporarily stored in a memory for a predetermined time period.

26. The program storage device of claim 25, wherein the predetermined time period is based on platform activity.

27. The program storage device of claim 25, wherein the platform is one of a local computer system and a networked computer system.

* * * * *